United States Patent [19]
Nicholson

[11] 3,799,664
[45] Mar. 26, 1974

[54] DUAL FOCUS MICROFICHE ASSEMBLY AND VIEWER
[75] Inventor: George H. Nicholson, La Crescenta, Calif.
[73] Assignee: UMF Systems Incorporated, Los Angeles, Calif.
[22] Filed: June 19, 1972
[21] Appl. No.: 264,366

[52] U.S. Cl. ................................. 353/27, 353/120
[51] Int. Cl. ........................................ G03b 21/11
[58] Field of Search ....... 353/27, 25, 120, 122, 100, 353/101

[56] References Cited
UNITED STATES PATENTS
3,319,518   5/1967   Carlson.............................. 353/27

Primary Examiner—Louis R. Prince
Assistant Examiner—A. J. Mirabito
Attorney, Agent, or Firm—Harris, Kern, Wallen & Tinsley

[57] ABSTRACT

A dual focus microfiche viewing system wherein spaced microimage bearing surfaces of superimposed microfiches are viewed slectively by focusing on the desired microimage bearing surface. The necessary spacing of the microimage bearing surfaces is maintained by the microfiches themselves. More particularly, the outer surfaces of two adjacent microfiches are the microimage bearing surfaces thereof, whereby the microimage bearing surfaces are spaced apart by the total of the thicknesses of the two microfiches, without any necessity for separate spacers, or the like.

5 Claims, 4 Drawing Figures

PATENTED MAR 26 1974  3,799,664

3,799,664

DUAL FOCUS MICROFICHE ASSEMBLY AND VIEWER

BACKGROUND OF THE INVENTION

The present invention relates in general to microfiches and viewers therefor and, more particularly, to a microfiche assembly and viewer of the dual focus type.

U.S. Pat. No. 3,191,490 to Jacob Rabinow, and U.S. Pat. No. 3,319,518 to Carl O. Carlson, disclose multiple focus microfiche viewing systems wherein microimage bearing surfaces of at least two superimposed transparent microfiches are viewed selectively by focusing on one or the other. If the microimage bearing surface being viewed is separated from the lens by another fiche or fiches, the observer literally looks through the intervening fiche or fiches. (It should be pointed out that such a dual or multiple focus system can be used only with microimages bearing line information of the type disclosed by Rabinow. More particularly, such line information may comprise letters, numerals, line drawings, or any information occupying but a small percentage of the microimage area.)

Such a dual focus or multiple focus microfiche viewing system is particularly useful where superimposed microimages bear related information, although it is not necessarily limited thereto.

In a dual or multiple focus microfiche system, it is essential that the microimage bearing surfaces be parallel and accurately spaced. Accurate spacing is essential so that changing the focus from one microimage bearing surface to another will result in precise coincidence of the focal plane of the lens and the desired microimage bearing surface. Otherwise, refocusing would be required when shifting from one microfiche to another, which is obviously undesirable.

The Carlson patent maintains accurate spacing of the microimage bearing surfaces of the fiches by applying laminates to both sides of the fiches and/or by inserting a separate spacer between adjacent fiches. The thickness of the films, laminates, and spacer, if used, are so selected as to space the microimage bearing surfaces apart accurately a predetermined distance such that, when focusing on 1 microimage bearing surface, the other or others are out of focus and thus not visible. The separation of the microimage bearing surfaces of the fiches may, for example, be of the order of ten to fifteen mils.

SUMMARY AND OBJECTS OF INVENTION

With the foregoing background in mind, the primary object of the present invention is to maintain the desired accurate spacing between two adjacent microimage bearing surfaces without the use of any laminates on the microfiches, and without the use of any separate spacer or spacers.

More particularly, an important object of the invention is to space the microimage bearing surfaces of two superimposed microfiches the desired distance apart, utilizing only the microfiches themselves.

Still more particularly, the invention may be summarized as comprising, and an important object is to provide, a dual focus microfiche assembly which comprises, two superimposed transparent microfiches having inner surfaces in contact and having outer surfaces bearing microimages in perpendicular arrays, the microimages on one of the outer surfaces being reversed, i.e., being mirror images, when viewed from a location outwardly of such outer surface.

With the foregoing, the two microimage bearing surfaces are automatically spaced apart a distance equal to the total of the thicknesses of the microfiches themselves, which is the essential feature of the invention. By utilizing microfiches of conventional thickness, i.e., of the order of 5 to 8 mils in thickness, the present invention inherently spaces the microimage bearing surfaces apart a distance of the order of 10 to 16 mils, without any laminates on the microfiches, without any separate spacers, or the like. A spacing of the microimage bearing surfaces of the order indicated is ample to completely defocus one microimage bearing surface while focusing on the other.

It will be understood that the microfiches may comprise any suitable transparent film material. Such materials are well known and examples are thought to be unnecessary.

By utilizing the microfiches themselves to space the microimage bearing surfaces apart accurately the desired distance, the present invention not only avoids such things as the expense of laminating the microfiches for the same purpose, or the expense and inconvenience of a separate spacer, but also minimizes such things as dust problems by reducing the number of surfaces involved in two superimposed microfiches.

The foregoing objects, advantages, features and results of the present invention, together with various other objects, advantages, features and results which will be evident to those skilled in the field of dual focus microfiche viewing in the light of this disclosure, may be achieved with the exemplary embodiment of the invention illustrated in the accompanying drawing described in detail hereinafter.

DESCRIPTION OF EXEMPLARY EMBODIMENT OF INVENTION

Figure 1:
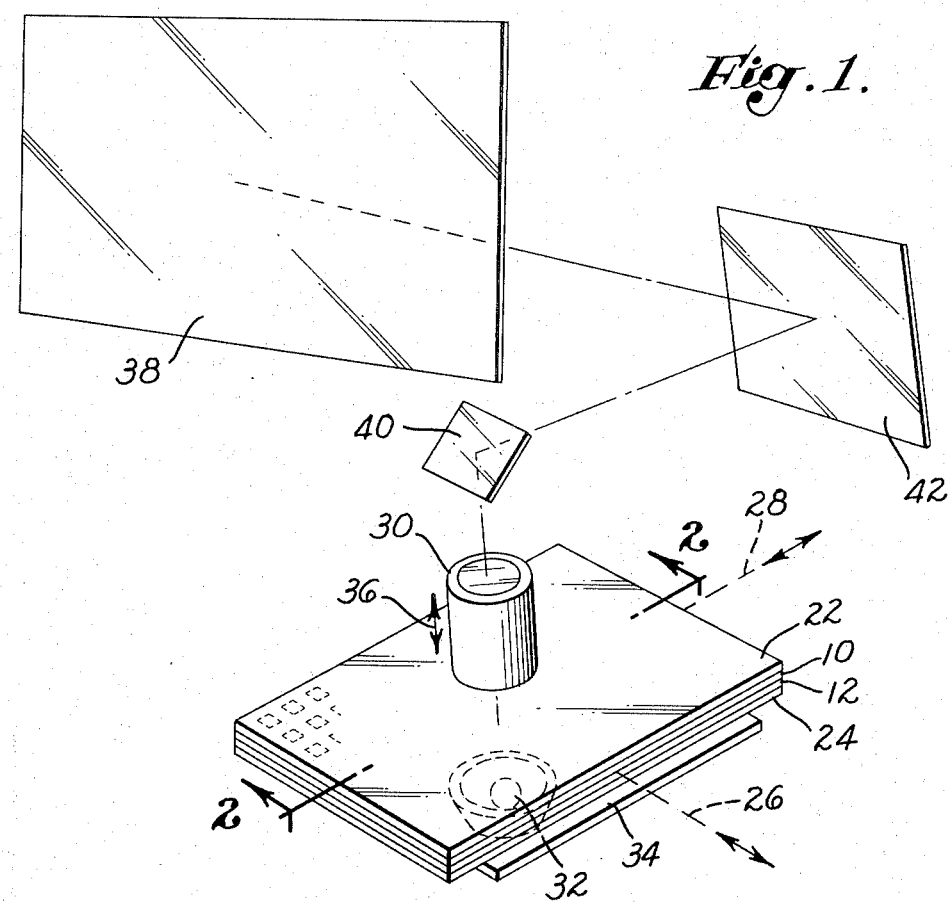
FIG. 1 is a schematic perspective view of a dual focus microfiche viewer of the invention.
Figure 2:
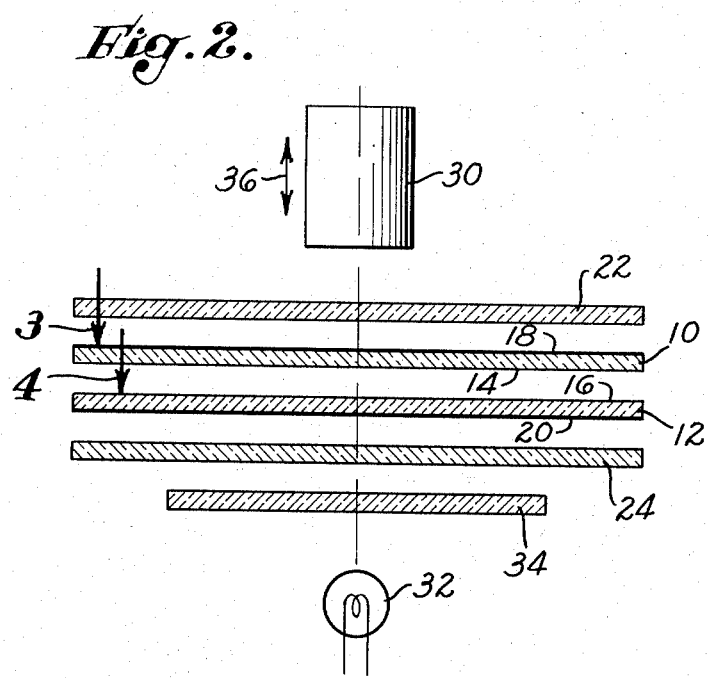
FIG. 2 is an enlarged, exploded sectional view taken as indicated by the arrowed line 2—2 of FIG. 1.

Referring to the drawing, the numerals 10 and 12 designate superimposed transport microfiches respectively having inner or adjacent surfaces 14 and 16 in contact. The 2 microfiches 10 and 12 respectively have outer surfaces 18 and 20 bearing microimages in perpendicular arrays. With the particular horizontal orientation shown for the microfiches 10 and 12, the microimage bearing surface 18 is the upper surface of the microfiche 10 and the microimage bearing surface 20 is the lower surface of the microfiche 12. However, it will be understood that such a horizontal orientation is not necessary.

Figure 3:
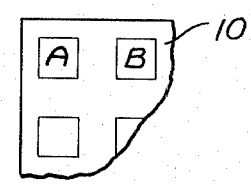
FIGS. 3 and 4 are fragmentary plan views of two microfiches forming part of the invention, FIGS. 3 and 4 respectively being taken as indicated by the arrows 3 and 4 of FIG. 2.
Figure 4:
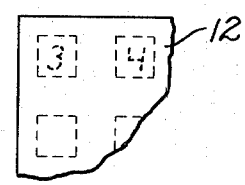

Viewed from below, i.e., viewed from a location outwardly of the microimage bearing outer surface 20, the microimages on the surface 20 are reversed with respect to the microimages on the outer surface 18 of the microfiche 10, when the latter are viewed from above. In other words, when viewed from below, the microimages on the surface 20 are mirror images relative to the microimages on the surface 18. Of course, viewed from above, the microimages on the surfaces 18 and 20 have the same relationship, as suggested in FIGS. 3 and 4.

With the foregoing construction of the microfiches 10 and 12, the microimage bearing surface 18 and 20 are spaced apart a predetermined distance when the inner surfaces 14 and 16 are in contact, such predetermined distance being the total of the thickness of the 2 microfiches. As previously indicated, this total thickness may be of the order of 10 to 16 mils, which is ample to permit focusing on one of the surfaces 18 and 20 while defocusing the other.

The microfiches 10 and 12 are clamped in superimposed relationship between two glass plates 22 and 24. The assembly of microfiches 10 and 12 and glass plates 22 and 24 is movable in perpendicular directions, corresponding to the perpendicular arrays of microimages on the microimage bearing surfaces 18 and 20, in any suitable manner. Means 26 and 28 for producing such perpendicular motions are shown diagrammatically in FIG. 1 by the broken lines 26 and 28.

With the foregoing arrangement, any desired pair of superimposed microimages on the microfiches 10 and 12 may be registered with a lens 30 receiving light passing through the superimposed microimages from a lamp 32. A glass heat shield 34 may be interposed between the lamp 32 and the microfiche and plate assembly.

The lens 30 is suitably mounted for movement along its axis, as indicated by the double headed arrow 36, between a position wherein the microimage bearing surface 18 is in focus and a position wherein the microimage bearing surface 20 is in focus. (In addition, the lens 30 may have a focus adjustment to bring one or the other of the microimage bearing surfaces 18 and 20 into initial focus in the corresponding position of the lens.)

The microimage bearing surfaces 18 and 20 may be brought into focus selectively by shifting the microfiche and glass plate assembly back and forth along the axis of the lens 30, if desired. HOwever, it is more convenient to shift the lens.

Ultimately, the desired one of a pair of superimposed microimages may be projected onto a screen 38 by way of mirrors 40 and 42.

As will be apparent from the foregoing, the present invention provides a very simple way of accurately spacing the microimage bearing surfaces 18 and 20 of the microfiches 10 and 12, and accomplishes this without any necessity for laminating the microfiches, interposing a spacer or spacers therebetween, or the like.

Although an exemplary embodiment of the invention has been shown diagrammatically for purposes of illustration, it will be understood that various changes, modifications and substitutions may be incorporated in such diagrammatic embodiment without departing from the spirit of the invention as defined by the claims hereinafter appearing.

The invention claimed is:

1. A dual focus fiche assembly, including two superimposed transparent fiches each being a single sheet of a single material having an outer surface bearing microimages in perpekdicular arrays and each having an inner surface, said inner surfaces being in mutual surface contact, and the microimages on one of said outer surfaces being reversed when viewed from a location outwardly of such outer surface.

2. A dual focus fiche assembly as claimed in claim 1, wherein the distance between said outer surfaces is less than 15 mils.

3. A dual focus fiche assembly as claimed in claim 2, wherein the distance between said outer surfaces is within a range between 10 and 15 mils.

4. In a dual focus fiche viewing system, the combination of:
 a. two superimposed transparent fiches each being a single sheet of a single material having an outer surface bearing microimages in perpendicular arrays and each having an inner surface, said inner surfaces being in mutual surface contact, and the microimages on one of said outer surfaces being reversed when viewed from a location outwardly of such outer surface;
 b. a lens on one side of said superimposed fiches;
 c. means for selectively causing said outer surfaces of said fiches and the focal plane of said lens to coincide; and
 d. means for relatively moving said superimposed fiches and said lens in the directions of said perpendicular arrays.

5. In a dual focus fiche viewing system, the combination of:
 a. two superimposed transparent fiches each being a single sheet of a single material having an outer surface bearing microimages in perpendicular arrays and each having an inner surface, said inner surfaces being in mutual surface contact, and the microimages on one of said outer surfaces being reversed when viewed from a location outwardly of such outer surface;
 b. a screen;
 c. means including a lens on one side of said superimposed fiches and a lamp on the other side thereof for projecting a microimage on one of said outer surfaces onto said screen;
 d. means for selectively causing said outer surfaces of said fiches and the focal plane of said lens to coincide; and
 e. means for relatively moving said superimposed fiches and said lens in the directions of said perpendicular arrays.

* * * * *